(12) United States Patent
Morii et al.

(10) Patent No.: US 7,192,461 B2
(45) Date of Patent: Mar. 20, 2007

(54) HIGH CONCENTRATION SILICA SLURRY

(75) Inventors: Toshio Morii, Yokkaichi (JP); Paul Brandl, Yokkaichi (JP)

(73) Assignee: Nippon Aerosil Co., Ltd., Tokyo (JP)

( * ) Notice: Subject to any disclaimer, the term of this patent is extended or adjusted under 35 U.S.C. 154(b) by 0 days.

(21) Appl. No.: 10/718,573

(22) Filed: Nov. 24, 2003

(65) Prior Publication Data

US 2004/0129176 A1  Jul. 8, 2004

(30) Foreign Application Priority Data

Nov. 22, 2002  (JP) ............................. 2002-339402

(51) Int. Cl.
  *C09G 1/02* (2006.01)
  *C09G 1/04* (2006.01)
  *C09K 3/14* (2006.01)
  *C09C 1/68* (2006.01)

(52) U.S. Cl. ............................. 51/308; 106/3; 106/482; 438/692; 438/693; 516/34; 423/335; 423/336; 423/337; 423/338; 423/339

(58) Field of Classification Search .................. 51/308; 106/3, 482; 438/692, 693; 516/34; 423/335–339
See application file for complete search history.

(56) References Cited

U.S. PATENT DOCUMENTS 3,673,104 A * 6/1972 Albrecht ...................... 516/81
4,588,421 A    5/1986 Payne
6,280,652 B1 * 8/2001 Inoue et al. ................ 252/79.1
6,699,808 B1 * 3/2004 Schwertfeger et al. ........ 501/20
6,740,589 B2 * 5/2004 Shimazu et al. ............ 438/691
2003/0103814 A1 * 6/2003 Greenwood et al. ......... 405/264
2003/0124045 A1 * 7/2003 Kobayashi et al. .......... 423/335
2004/0077768 A1 * 4/2004 Greenwood ................. 524/492

FOREIGN PATENT DOCUMENTS

| JP | 62-30333 | 2/1987 |
| JP | 5-154760 | 6/1993 |
| JP | 2001-48536 | 2/2001 |
| JP | 2001-152134 | 6/2001 |
| JP | 2001-342455 | 12/2001 |
| JP | 2002-3213 | 1/2002 |

* cited by examiner

*Primary Examiner*—Michael Marcheschi
(74) *Attorney, Agent, or Firm*—Oblon, Spivak, McClelland, Maier & Neustadt, P.C.

(57) ABSTRACT

A high concentration silica slurry can be used for polishing of substrates, such as semiconductor materials. The slurry contains a silica powder dispersed in an solvent. The silica slurry has a silica concentration of more than 50% by weight and a viscosity of less than 1000 mPa·s, wherein the silica powder has a ratio DL/DT of less than 1.3, wherein DL is an average particle size of the silica powder measured by a laser diffraction particle size distribution method and DT is an average primary particle size of the silica powder measured by a TEM photography observation, and wherein the silica powder has an average primary particle size of from 0.08 μm to 0.8 μm.

17 Claims, No Drawings

HIGH CONCENTRATION SILICA SLURRY

BACKGROUND OF THE INVENTION

1. Field of the Invention

The present invention relates to a silica slurry having low viscosity even for a high silica concentration. This is achieved by using a silica powder having an uniform particle size and low agglomeration. The silica powder can be dispersed over a wide concentration range without precipitating and while maintaining a low viscosity. The resulting slurry is excellent in handling, stable with the passage of time, and suitable for high-speed polishing or rough polishing. Moreover, since the impurity concentration is low, it is suitable for chemical mechanical polishing of semiconductor materials. Since the silica dispersion slurry can be handled with a high concentration of silica, the supplying cost of the slurry is low.

The present invention also relates to a polishing composite which includes the above silica slurry and which has excellent performance.

2. Discussion of the Background

A dispersion slurry of fumed silica or colloidal silica has been used in a chemical mechanical polishing (CMP), (Japanese Patent Laid Open No. JP62-30333A, JP5-154760A, JP2001-342455A). Generally, a polishing process of a silicon wafer is classified into three processes, i.e., a primary polishing, a secondary polishing and a finishing polishing. It is required that after the finishing polishing the final surface has no scratch and haze. Furthermore, a high purity of the polishing slurry is strongly required in order to prevent metal ionic contaminations resulting from taking metal ions, especially sodium, into the surface layer of the substrate at the time of polishing.

SUMMARY OF THE INVENTION

In order to obtain a polishing liquid having few metal contaminations and excellent polishing accuracy and speed, it is necessary that the slurry of silica powder has excellent dispersibility, low viscosity, and excellent stability with the passage of time even for high silica concentrations. In addition, high purity silica powder should be used. However, the silica concentration of conventional silica dispersion slurries is limited about 40%. If the silica concentration is more than 40%, the suitable flowability is lost easily. Moreover, the conventional dispersion liquid has a problem that the viscosity stability with the passage of time is low. Especially, in the case of the silica powder having the fine particle size, this problem is large. More concretely, for example, in the case of a conventional slurry using fumed silica having an average primary particle size of from 7 to 50 nm, agglomeration of the silica powder occurs in the slurry in many cases. As a result, the particle size at the time of polishing is not uniform, and the viscosity change with the passage of time is large.

Accordingly, it is an object of the present invention to solve the problems of conventional silica slurries, and to provide a high concentration silica slurry having low viscosity and little viscosity change with the passage of time even for high concentrations of silica.

This and other objects have been achieved by the present invention the first embodiment of which includes a high concentration silica slurry, comprising:

a silica powder dispersed in an solvent, said silica slurry having a silica concentration of more than 50% by weight and a viscosity of less than 1000 mPa·s, wherein said silica powder has a ratio DL/DT of less than 1.3, wherein DL is an average particle size of the silica powder measured by a laser diffraction particle size distribution method and DT is an average primary particle size of the silica powder measured by a TEM photography observation, and wherein said silica powder has an average primary particle size of from 0.08 μm to 0.8 μm.

In another embodiment, the present invention provides a polishing composite including the above slurry.

In yet another embodiment, the present invention provides a process for polishing a substrate, comprising:

contacting the surface of said substrate with the above slurry.

DETAILED DESCRIPTION OF THE INVENTION

The present invention provides a high concentration silica slurry and a polishing composite.

In a first embodiment, the present invention provides a high concentration silica slurry having a silica concentration of more than 50 weight % and a viscosity of less than 1000 mPa·s, wherein the silica powder is dispersed in an solvent, and wherein the silica has a ratio DL/DT of less than 1.3. DL is an average particle size of the silica powder measured by a laser diffraction particle size distribution method and DT is an average primary particle size of the silica powder measured by a TEM (Transmission Electron Microscope) photography observation. The silica has the average primary particle size of from 0.08 μm to 0.8 μm.

In a second embodiment, the present invention provides that the above high concentration silica slurry has a silica concentration of from more than 70% by weight to less than 80% by weight and a viscosity of less than 800 mPa·s at the time of preparing.

In a third embodiment, the present invention provides that the above high concentration silica slurry has a ratio B/A of less than 1.5, wherein A is the viscosity of the slurry measured at the time of preparing and B is the viscosity after one month.

In a fourth embodiment, the present invention provides that the above high concentration silica slurry has an impurity concentration of the silica powder of less than 1.0 ppm of each of sodium and potassium, less than 1.0 ppm of aluminum, and less than 5 ppm of each of sulfur, nickel, chromium, and iron.

In a fifth embodiment, the present invention provides for a polishing composite, comprising the above high concentration silica slurry.

Other, preferred embodiments will be described below. The silica dispersion slurry of the present invention uses a silica powder having few impurities and has a low viscosity and little viscosity change with the passage of time even at high concentrations of silica. Therefore, the silica dispersion slurry of the present invention is suitable as a polishing composite for substrates such as silicon wafers or the like. In addition, when said silica dispersion slurry is used in chemical mechanical polishing (CMP), it is possible to obtain excellent polishing speed and accuracy.

Hereinafter, the present invention is explained more concretely according to preferred embodiments. In addition, "%" is given as weight percent unless otherwise specified.

The silica slurry of the present invention is a high concentration silica slurry having a silica concentration of more than 50 weight % and a viscosity of less than 1000 mPa·s. The silica powder is dispersed in an solvent and has the ratio DL/DT of less than 1.3. DL is an average particle size of the silica powder measured by a laser diffraction particle size distribution method and DT is an average primary particle size of the silica powder measured by a TEM photography observation. In addition, the silica powder has an average primary particle size of from 0.08 μm to 0.8 μm.

Preferably, the silica powder used in the slurry of the present invention has an average primary particle size of from 0.08 μm to 0.8 μm. When a silica powder having an average primary particle size of smaller than 0.08 μm is used, the slurry becomes easily unstable, so that the viscosity change with the passage of time and the precipitation in the slurry occur easily. On the other hand, when the silica powder having an average primary particle size of larger than 0.8 μm is used, the powder precipitates easily in the slurry, and causes scratches or the like at the time of polishing.

Moreover, the silica powder used in the slurry of the present invention preferably has a ratio DL/DT of less than 1.3. DL is the average particle size of the silica powder measured by the laser diffraction particle size distribution method and DT is an average primary particle size of the silica powder measured by the TEM photography observation. Since the TEM observation is suitable to measure the primary particle size, the average particle size of the silica powder by the TEM photography observation (DT) shows the primary particle size. On the other hand, the laser diffraction particle size distribution method is suitable to measure the particle size including the secondary agglomerates, so that the average particle size of the silica powder measured by the laser diffraction particle size distribution method (DL) shows the particle size including the secondary agglomerates. Therefore, the ratio of these particle sizes (DL/DT) shows the ratio of the agglomeration of particles. More concretely, the silica powder having a ratio of the average particle sizes (DL/DT) of more than 1.3, has many secondary agglomerates, so that it is difficult to make the silica slurry having high concentration and low viscosity.

As mentioned above, the silica powder of the present invention has few secondary agglomerates, and as for the secondary agglomerates, it is preferable that the average particle size of them is mostly smaller than 1.0 μm. Moreover, it is preferable that more than 95% of the agglomerated particles are in one peak of a size distribution curve in the range of the, particle size of less than 1.0 μm. When less than 95% of the agglomerated particles are in one peak of the size distribution curve or the average particle size of the secondary agglomerates in this peak is more than 1.0 μm, the slurry becomes unstable, so that the viscosity change with the passage of time becomes large.

Moreover, it is preferable that the impurity concentration for each of sodium and potassium in the silica powder is less than 1.0 ppm. When the impurity concentration of each of sodium and potassium is more than 1.0 ppm in the silica powder which is dispersed in a slurry used for polishing of wafers or the like, ionic impurities of sodium and potassium contained in the silica powder are taken into the surface of the wafer and contaminate the surface layer of the wafer at the time of polishing, so that scratches or haze occur easily on the polished surface.

In order to prevent metal contaminations, it is preferable that the concentrations of impurities other than sodium and potassium are kept as low as possible. More concretely, for example, it is preferable that aluminum is less than 1.0 ppm, and each of sulfur, nickel, chromium and iron is less than 0.5 ppm. More preferably, each of sulfur, nickel and chromium is less than 0.1 ppm.

A silica powder having low impurities concentrations as described above and a particle size as described above is, for example, a fumed silica or the like produced by a dry process, such as a flame hydrolysis method or the like. If the silica powder is produced by a wet process, it is difficult to obtain a slurry having the above mentioned levels of impurities concentrations or less. As the silica powder produced by a dry process it is preferable to use, for example, the silica powder produced by the method described in Japanese Patent Laid Open No. JP2002-3213A. This production method is to produce an amorphous fine silica powder by introducing a gaseous silicon compound into a flame and hydrolyzing it. In this production method, the amorphous silica powder having an average particle size (median size) of from 0.08 to 0.8 μm and a specific surface area of from 5 to 30 m$^2$/g as measured by the BET method, is produced by making the flame temperature to be a melting point of silica, growing the silica particle while keeping the silica concentration in the flame of more than 0.25 kg / Nm$^3$, and maintaining the grown silica particle at a high temperature of more than the melting point for a short time.

In said production method, as a raw material, silicon compounds, such as, silicon tetrachloride, trichlorosilane, dichlorosilane, methyltrichlorosilane or the like are used. The hydrolysis reaction using such compounds can be carried out at a high temperature by introducing them into the oxy-hydrogen flame in the gaseous state. These gaseous silicone compounds, such as silicon tetrachloride or the like, are suitable to produce a high purity silica particle since impurities in the raw material can be removed easily by a distillation refining.

By using silica particles, in which the ratio of average particle size (DL/DT) and the average primary particle size are in the above-mentioned range, it is possible to obtain a low viscosity silica slurry having a viscosity of less than 1000 mPa·s and little viscosity change with the passage of time, even for high silica concentrations of more than 50%. More concretely, for example, it is possible to obtain a low viscosity silica slurry, in which the silica concentration is more than 70%, the initial viscosity is less than 800 mPa·s, and the ratio B/A is less than 1.5, where B is the viscosity of the slurry measured after one month and A is that at the time of preparing (hereinafter, B/A is referred to as the viscosity ratio with the passage of time). When the viscosity ratio with the passage of time (B/A) is more than 1.5, the viscosity change with the passage of time is large and the slurry is unstable.

It is preferable that the silica concentration of the slurry is less than 80%. When the silica concentration is more than 80%, the viscosity becomes too high, and gelation or precipitation occur easily. Moreover, the stability with the passage of time of the slurry is reduced, so that gelation or precipitation occur easily by the general temperature change or a difference in transportation or preservation conditions. Furthermore, when the viscosity of the slurry is more than 1000 mPa·s, the handling becomes difficult.

Polar solvents, such as the distilled water or the like, are preferred as dispersion liquids. Other polar solvents include alcohols and mixtures of water with alcohols. Preferred alcohols are those having 1 to 4 carbon atoms. It is preferable that the viscosity of the solvent is less than 10 mPa·s.

In the silica slurry of the present invention, two or more than two kinds of silica powder having different particle sizes can be used as long as the characteristics of the silica powder, such as the concentration of impurities, the ratio of average particle size (DL/DT) and the average primary particle size, are in above-mentioned range. Furthermore, other metal oxide powders, such as an alumina powder, composite oxide powders, doped materials or the like, can be contained with the silica powder. It is necessary that the amount of these oxide powders is in the range which does not disturb the characteristics of the slurry of the present invention. By containing these metal oxide powders, the polishing according to the purpose can be carried out.

EFFECT OF THE INVENTION

The silica slurry of the present invention has a high silica concentration and low viscosity, i.e., the silica concentration is more than 50% and the viscosity is less than 1000 mPa·s. This is achieved by using a silica powder in which the ratio of the average particle size (DL/DT) and the average primary particle size are prepared in a fixed range. It is preferable that the silica concentration is from 70% by weight to 80% by weight, the viscosity at the time of preparing is less than 800 Pa·s, and the viscosity ratio with the passage of time (B/A) is less than 1.5. The silica slurry of the present invention has low viscosity and little viscosity change with the passage of time, even at high silica concentrations. More preferably, the silica slurry of the present invention uses a silica having low impurities, in which the impurity concentration of each of sodium and potassium is less than 1.0 ppm, the amount of aluminum is less than 1.0 ppm, and the content of each of sulfur, nickel, chromium and iron is less than 0.5 ppm. Therefore, the silica slurry having high silica concentration of the present invention is suitable to be used for polishing and, in the chemical mechanical polishing (CMP) or the like. Comparatively high polishing speeds can be used and the polishing accuracy is excellent.

Having generally described this invention, a further understanding can be obtained by reference to certain specific examples which are provided herein for purposes of illustration only, and are not intended to be limiting unless otherwise specified.

EXAMPLES

Hereinafter, the present invention will be explained more concretely with examples and comparison examples.

In each example, the viscosity is measured by using a Rheo Stress meter produced by HAAKE Co., and the particle size is measured by using a laser dispersion type particle size distribution meter produced by HORIBA Co. The viscosity is the value at the shearing speed of 100/s, and the viscosity change with the passage of time is measured after one month from the time of the slurry preparation.

Example 1

Fumed silica produced by Nippon Aerosil Co. ltd, having an impurities concentration as shown in Table 1 (a trade name was VP-OX30 and the specific surface area was 30 $m^2/g$ as measured by the BET method) was added to distilled water. The added fumed silica was dispersed by stirring to obtain a slurry, and the pH was adjusted to 8.9. Thus, a slurry having a silica concentration of 75% was prepared. The viscosity and the viscosity ratio with the passage of time of this slurry were measured. These results are shown in Table 1 together with the conditions for obtaining the slurry.

Example 2

Fumed silica produced by Nippon Aerosil Co. ltd, having an impurities concentration as shown in Table 1 (the trade name was VP-OX10 and the specific surface area was 10 $m^2/g$ as measured by the BET method) was added to distilled water. The added fumed silica was dispersed by stirring to obtain a slurry, and the pH was adjusted to 9.2. Thus, a slurry having the silica concentration of 80% was prepared. The viscosity and the viscosity ratio with the passage of time of this slurry were measured. These results are shown in Table 1 together with the conditions for obtaining the slurry.

TEST EXAMPLE

Fumed silica produced by Nippon Aerosil Co. ltd, having an impurities concentration as shown in Table 1 (the trade name was VP-OX30 and the specific surface area was 30 $m^2/g$ by the BET method) was added to distilled water. The added fumed silica was dispersed by stirring to obtain a slurry, and the pH was adjusted to 8.9. Thus, a slurry having the silica concentration of 85% was prepared. The viscosity and the viscosity ratio with the passage of time of this slurry were measured. These results are shown in Table 1 together with the conditions for obtaining the slurry.

Comparison Example 1

A commercial colloidal silica was added to distilled water. The added colloidal silica was dispersed by stirring to obtain a slurry, and the pH was adjusted to 9.2. Thus, a slurry having the silica concentration of 70% was prepared. The viscosity and the viscosity ratio with the passage of time of this slurry were measured. These results are shown in Table 1 together with the conditions for obtaining the slurry.

Comparison Example 2

A slurry having the silica concentration of 70% was prepared by the same process as the Comparison Example 1 except a silica powder produced by a wet process was used instead of the colloidal silica. The viscosity and the viscosity ratio with the passage of time of this slurry were measured. These results are shown in Table 1 together with the conditions for obtaining the slurry.

Comparison Example 3

A slurry was prepared by the same process as in Example 1 except fumed silica having a ratio of the average particle size (DL/DT) of 5.5 and an average primary particle size of 0.012 μm, was used. The concentration of silica, the viscosity and the viscosity ratio with the passage of time of this slurry were measured. These results are shown in Table 1 together with the conditions for obtaining the slurry.

As shown in Table 1, in the case of each silica slurry of Examples 1 and 2 of the present invention, each initial viscosity of the slurry at the time of preparing was 700 mPa·s and 800 mPa·s, respectively, even if each silica concentration was more than 75%. That is, each viscosity of the silica slurries was low. Moreover, each viscosity of the silica slurries after one month was 730 mPa·s and 850 mPa·s respectively, so that each slurry had little viscosity change with the passage of time and was stable. On the other hand, in the case of Comparison Example 1, the average primary particle size is too small and the impurities concentration is higher, and in the case of Comparison Example 2, the ratio of the average particle size (DL/DT) is relatively high and the impurities concentration is remarkably high. Therefore, the silica slurry including the silica disclosed in Comparison Examples 1 and 2 is unsuitable to be used for polishing. Moreover, in the case of Comparison Example 3, since the ratio of the average particle size (DL/DT) is larger and the average primary particle size is lower than the range of present invention, the viscosity of the slurry is remarkably high: more than 3000 mPa·s even if the silica concentration was low as 10%.

TABLE 1

|  |  |  | Example 1 | Example 2 | Test Example | Comparison example 1 | Comparison example 2 | Comparison example 3 |
|---|---|---|---|---|---|---|---|---|
| Silica Particle | Impurities Amount [ppm] | Na | <1.0 | <1.0 | <1.0 | 277 | 2226 | <1.0 |
|  |  | K | <1.0 | <1.0 | <1.0 | <10 | <1.0 | <1.0 |
|  |  | S | <0.1 | <0.1 | <0.1 | <1.0 | 1200 | <0.1 |
|  |  | Fe | <0.5 | <0.5 | <0.5 | <1.0 | 210 | <0.5 |
|  |  | Al | <1.0 | <1.0 | <1.0 | <1.0 | <1.0 | <1.0 |
|  |  | Ni | <0.1 | <0.1 | <0.1 | <1.0 | <1.0 | <0.1 |
|  |  | Cr | <0.1 | <0.1 | <0.1 | <1.0 | <1.0 | <0.1 |
|  | DL/DT |  | 1.2 | 1.1 | 1.2 | 1.1 | 1.6(*) | 1.5(*) |
|  | Average Primary Particle Size (μm) |  | 0.1 | 0.15 | 0.065(*) | 0.03(*) | 0.25 | 0.012(*) |
| Slurry | Silica Concentration (%) |  | 75 | 80 | 85 | 70 | 70 | 10 |
|  | Viscosity (at the time of preparing) [A] |  | 700 | 800 | 880 | 630 | 820 | >3000 |
|  | Viscosity (after one month) [B] |  | 730 | 850 | 1620 | 660 | 750 | >3000 |
|  | Viscosity Ratio with Passage of Time [B/A] |  | 1.04 | 1.06 | 1.84(*) | 0.95 | 0.91 | — |

(Note)
DL is an average particle size by a laser dispersion type particle size distribution meter, and DT is an average particle
DL/DT is the ratio of the average particle size. The unit of the viscosity is [mPa · s]
(*)is outside the range of the preferable range of the present invention Japanese patent application 2002-339402 filed Nov. 22, 2002, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A high concentration silica slurry, consisting of:
   a fumed silica powder dispersed in a solvent,
   said solvent consisting of at least one selected from the group consisting of water and alcohols,
   said silica slurry having a silica concentration of more than 50% by weight and a viscosity of less than 1000 mPa·s,
   wherein said silica powder has a ratio DL/DT of less than 1.3, wherein DL is an average particle size of the silica powder measured by a laser diffraction particle size distribution method and DT is an average primary particle size of the silica powder measured by a TEM photography observation,
   wherein a ratio B/A is less than 1.5, where A is the viscosity of the slurry measured at the time of preparing and B is the viscosity after one month, and
   wherein said silica powder has a uniform particle size and an average primary particle size of from 0.08 μm to 0.8 μm.

2. The high concentration silica slurry according to claim 1, wherein the silica concentration is from more than 70% by weight to less than 80% by weight and the viscosity is less than 800 mPa·s at the time of preparing.

3. The high concentration silica slurry according to claim 1, wherein said solvent is water.

4. A polishing composite, comprising:
   the high concentration silica slurry of claim 1.

5. The polishing composite according to claim 4, wherein the silica concentration is from more than 70% by weight to less than 80% by weight and the viscosity is less than 800 mPa·s at the time of preparing.

6. The polishing composite according to claim 4, wherein the impurity concentrations of said silica powder are less than 1.0 ppm of each of sodium and potassium, less than 1.0 ppm of aluminum, and less than 5 ppm of each of sulfur, nickel, chromium, and iron.

7. The polishing composite according to claim 4, wherein said solvent is water.

8. A process for polishing a substrate, comprising:
   contacting the surface of said substrate with the slurry of claim 1.

9. The process according to claim 8, wherein said substrate is a silicon wafer.

10. The process according to claim 8, wherein the silica concentration is from more than 70% by weight to less than 80% by weight and the viscosity is less than 800 mP·s at the time of preparing.

11. The process according to claim 8, wherein impurity concentrations of said silica powder are less than 1.0 ppm of each of sodium and potassium, less than 1.0 ppm of aluminum, and less than 5 ppm of each of sulfur, nickel, chromium, and iron.

12. The process according to claim 8, wherein said solvent is water.

13. The process according to claim 8, wherein said substrate is a semiconductor material.

14. The high concentration silica slurry according to claim 1, wherein impurity concentrations of said silica powder are less than 1.0 ppm of each of sodium and potassium, less than 1.0 ppm of aluminum, and less than 5 ppm of each of sulfur, nickel, chromium, and iron.

15. The high concentration silica slurry according to claim 1, wherein the water is distilled water.

16. The high concentration silica slurry according to claim 1, wherein the alcohols are alcohols having from 1 to 4 carbon atoms.

17. The high concentration silica slurry according to claim 1, wherein the solvent consists of at least one selected from the group consisting of distilled water and alcohols having from 1 to 4 carbon atoms.

* * * * *